(12) United States Patent
Bradley

(10) Patent No.: US 6,315,804 B1
(45) Date of Patent: Nov. 13, 2001

(54) DRIFT ELIMINATOR

(75) Inventor: Randall S. Bradley, Ellicott City, MD (US)

(73) Assignee: Evapco International, Inc., Wilmington, DE (US)

( * ) Notice: Subject to any disclaimer, the term of this patent is extended or adjusted under 35 U.S.C. 154(b) by 0 days.

(21) Appl. No.: 09/479,718

(22) Filed: Jan. 7, 2000

(51) Int. Cl.⁷ .................................................. B01D 45/08
(52) U.S. Cl. ................................ 55/440; 55/443; 55/444; 96/356; 261/112.2
(58) Field of Search ............................ 55/437, 440, 442, 55/443, 444; 261/112.2, DIG. 11; 96/356, 358

(56) References Cited

U.S. PATENT DOCUMENTS

| | | |
|---|---|---|
| 2,986,379 | 5/1961 | Kramig, Jr. . |
| 3,290,867 | 12/1966 | Jacir . |
| 3,338,035 | 8/1967 | Dinkelacker . |
| 3,526,393 | 9/1970 | Meek . |
| 3,738,626 | 6/1973 | Norbäck . |
| 3,938,972 * | 2/1976 | Sugimura ............................... 55/440 |
| 4,141,706 | 2/1979 | Regehr . |
| 4,333,749 | 6/1982 | Holmberg et al. . |
| 4,500,330 | 2/1985 | Bradley, Jr. et al. . |
| 4,514,202 | 4/1985 | Kinney, Jr. et al. . |
| 4,553,993 * | 11/1985 | Wigley .................................... 55/440 |
| 4,601,731 | 7/1986 | Michelson . |
| 4,968,328 * | 11/1990 | Duke ....................................... 55/440 |
| 5,104,431 * | 4/1992 | Fewell, Jr. ............................. 55/440 |
| 5,124,087 | 6/1992 | Bradley et al. . |
| 5,203,894 * | 4/1993 | Chowaniec ............................. 55/440 |
| 5,230,725 * | 7/1993 | Chowaniec ............................. 55/440 |
| 5,268,011 * | 12/1993 | Wurz ...................................... 55/440 |
| 5,269,823 * | 12/1993 | Wurz ...................................... 55/440 |
| 5,296,009 * | 3/1994 | Duke ....................................... 55/440 |
| 5,464,459 | 11/1995 | VanBuskirk et al. . |
| 5,972,062 * | 10/1999 | Zimmermann ......................... 55/440 |

FOREIGN PATENT DOCUMENTS

| | | |
|---|---|---|
| 859708 | 4/1978 | (BE) . |
| 0 043 648 A2 | 1/1982 | (EP) . |
| 0 501 146 A1 | 9/1992 | (EP) . |
| 58-101723 | 12/1981 | (JP) . |

\* cited by examiner

Primary Examiner—David A. Simmons
Assistant Examiner—Minh-Chau T. Pham
(74) Attorney, Agent, or Firm—Akin, Gump, Strauss, Hauer & Feld, L.L.P.

(57) ABSTRACT

A cellular drift eliminator for removing mist from a mist-laden gas stream includes a plurality of blades with a spacer element interspersed between every two blades. Both the blades and spacer elements have a longitudinally undulating shape with at least one undulation transverse to the direction of travel of the stream passing through the eliminator. Each spacer element has corrugations oriented transverse to the spacer element undulation. Each corrugation has two side walls connecting a flattened apex extending from the front face of the spacer elements and a flattened valley extending from the rear face of the spacer element. Each spacer element has flat planar portions formed at its lower edge in the regions of the flattened apices and valleys of the corrugations and cut portions extending from the lower edge in the regions of the side walls of the corrugations. At least some portions of the flattened apices and valleys of the corrugations of each spacer element are bonded to respective bonding portions of the rear face of a first adjacent blade and the front face of a second adjacent blade.

12 Claims, 6 Drawing Sheets

DRIFT ELIMINATOR

BACKGROUND OF THE INVENTION

Figure 1:
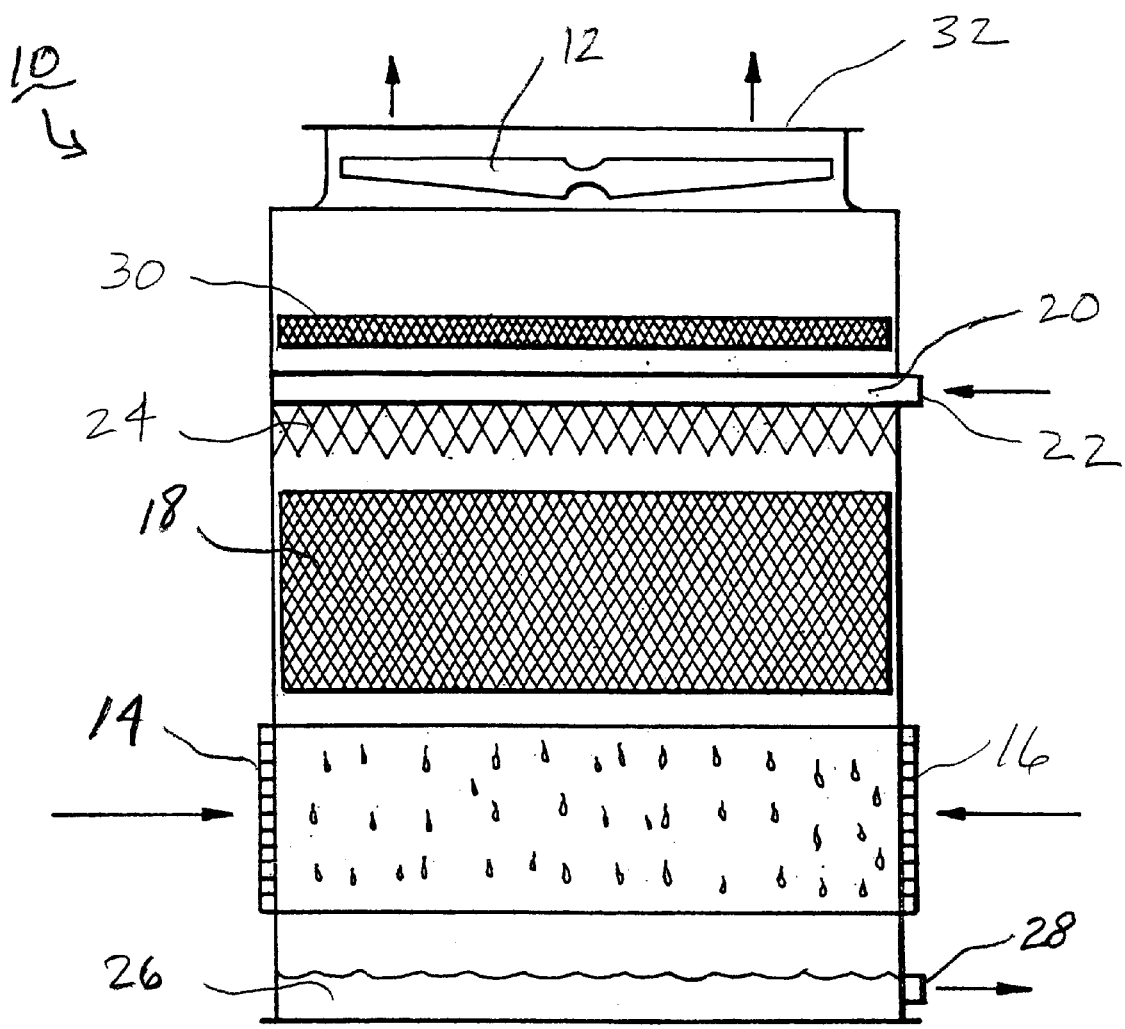

The present invention relates to a drift eliminator, sometimes referred to as a mist eliminator, a critical element in both direct and indirect counter-flow and cross-flow cooling towers, spray filled towers, and evaporative condensers, all of which are hereinafter categorically referred to as "tower". More particularly, the drift eliminator of the present invention has a structure that improves drainage, elevates the drift point, and reduces air pressure drop and therefore power requirements in the equipment in which it is used, resulting in enhanced thermal efficiency.

A drift eliminator has the function of stripping entrained water droplets or mist from the gas (air, typically) stream passing out of the tower. Without drift eliminators, evaporative cooling equipment would be impractical because a majority of the circulating water would be blown right out of the top of the tower. Further, drift is very objectionable because of excess loss of circulating water, loss of water treatment chemicals, and wetting of the space surrounding the tower with its ensuing hazard potentials such as ice formation, staining of surrounding cars and buildings, and spread of bacteria.

A drift eliminator is normally comprised of a plurality of channeling elements having a shape, curved or otherwise, which causes one or more changes in the air direction passing through the channel. The channel shape is designed such that air will pass through the channels with a minimum pressure drop, but the air direction change is too sharp for water droplets entrained in the air stream to pass. The momentum of the drop will cause it to impinge on the surface of the drift eliminator as it changes direction, and the action of gravity will cause the droplets to flow over the surface of the eliminator and fall back into the cooling tower. Water droplets that make it past the curvature will normally continue to be carried along with the exiting air. This escaping water spray known as "drift" or "carry-over" emanates from the equipment. While this is the primary mode of drift formation, other modes exist. The second most common mode of drift formation occurs when upward air pressure and fluid shear forces reverse the downward gravity force on the water impinged on the drift eliminator surface and push the accumulated water film to the top edge of the eliminator surface. The water film on the top edge of the eliminators coalesces to large drops that are picked up by the passing air and ejected from the tower. Large water drop drift is most commonly encountered when eliminators have become flooded, that is, their impingement surface has been coated with a thick water film.

"Drift rate" relates to the amount of water spray that is carried out of the tower with the air. It is quantitatively measurable and is commonly expressed as a percentage of the circulating water flow in a tower. Drift rates are usually very small, less than 0.01%, and drift eliminators are selected by their drift rate performance which varies with tower application and characteristics that differ based on their manufacturer. The air velocity at which drift eliminators fail to function by exceeding the specified drift rate, thereby passing excessive drift out of the tower, is known as the "drift point" or "spit point". In a tower, many factors influence both the drift point and the mode of drift formation. These factors include the geometry of the eliminator, the proximity of the eliminator to the tower's water distribution system, the circulating water flow inside the tower, the predisposition of the air pattern approaching the eliminator, water quality, fouling coatings on the eliminator, and the operating time history of the tower. However, for a given eliminator geometry and tower geometry, the controlling factors on the drift point are circulating water flow and air velocity.

Figure 11:
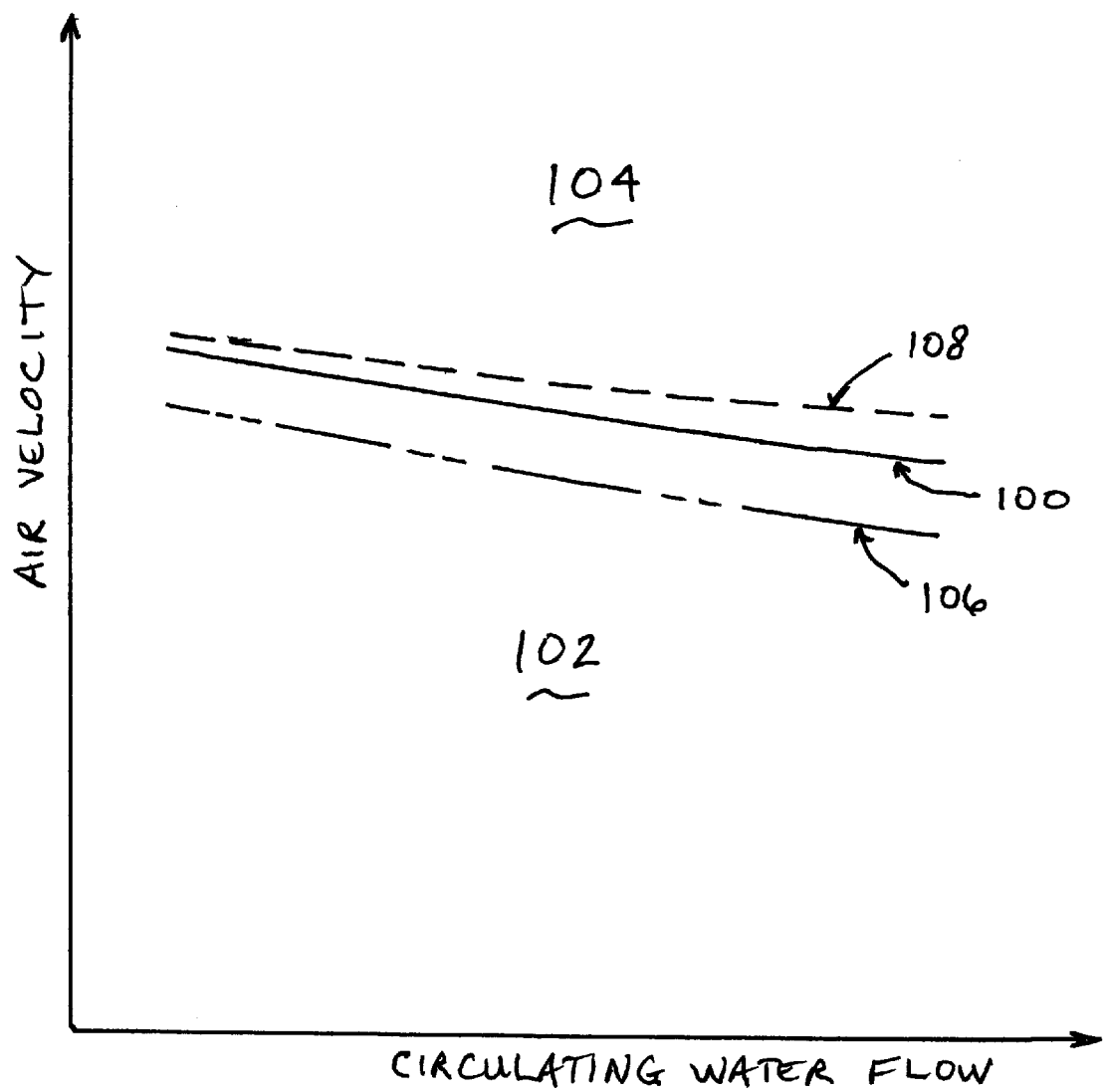

FIG. 11 schematically graphs the relationship between circulating water flow and air velocity inside a tower and its effect on the drift point. Circulating water rate is shown as the ordinate, and air velocity is the abscissa. A drift point curve 100 separates a region 102 of acceptable drift rate, which is below the curve, from a region 104 of excessive drift, which is above the curve. The geometry of the eliminator and the geometry of the tower will act to shift the drift point curve generally upward or downward. For modern, high-efficiency drift eliminators, the drift point corresponds to an air velocity typically in the range of 500 to 800 feet per minute (fpm) in the passageway where the drift eliminator is mounted in the tower at circulating water flow rates over the wet deck fill of 3 to 20 gallons per minute per square foot (gpm/ft$^2$) of tower plan area. It should also be noted that as the circulating water rate increases, the eliminator tends toward flooding and large droplet drift formation.

Some equipment designs or common maintenance problems predispose drift eliminators to operate at lower drift points than would be desired for the tower's intended purpose. Examples of the aforementioned are towers with high circulating water rates, towers with eliminators directly above but in contact with the circulating water spray system, or towers with poorly maintained water distribution nozzles that force water spray directly into the drift eliminators because these conditions tend to flood eliminators. When eliminators are flooded, their consequent drift point is reduced and the tower's air velocity must be reduced to prevent drift. The result is a loss in overall thermal capability.

It is typical on large counter-flow towers, particularly the field-erected type, to have a substantial plenum space between the spray system and the drift eliminators, moderate water flows, moderate air flows, and regular maintenance attention, all of which create a more ideal eliminator application environment. In contrast, factory assembled towers (condensers) have shipping constraints that require a very compact tower, and the drift eliminators are assembled directly on top of the spray system. Further, the broad demand for energy efficient, compact, factory-assembled towers dictates the use of eliminators in the adverse environments of high circulating water flows (8–20 gpm/ft$^2$ inside the tower), high air velocity (600–800 fpm), and continual operation with minimal spray system maintenance. The present invention particularly, but not exclusively, targets drift eliminators for these demanding conditions associated with factory-assembled towers.

The current state of the art for counter-flow drift eliminators can generally be divided between parallel blade eliminators and cellular eliminators. Most induced draft towers use cellular eliminators, while most forced draft towers use parallel blade eliminators, but there is no specific requirement for either. Parallel blade eliminators typically have a plurality of parallel curved blades made into sections that can be handled by maintenance personnel. The blades are separated by discrete spacers, which may be separate items or integrally formed in the blade, or the blades may be spaced apart by formed end caps which retain the ends of the blades in a defined spaced relationship.

The most common eliminator used in induced draft counter-flow towers is a cellular drift eliminator. When viewed from the top or bottom, a cellular drift eliminator appears as a plurality of parallel, curved tubes and is distinguishable from an eliminator made of parallel blades. The cellular drift eliminator may be comprised of a plurality of parallel curved surfaces that create the impingement surfaces for water droplets. Between the curved surfaces, a spacing element forms small cells, as in the present invention. Cellular eliminators have also been fabricated from mating corrugated curved blades. The distinctive features of cellular eliminators are that the tubular design adds strength to the eliminator assembly and creates further traps for water migration and droplet impingement. Because of the design, cellular drift eliminators have a higher drift point than parallel blade eliminators, but at a slightly higher pressure drop. Cellular drift eliminators are normally flat on the top and bottom. The strong, flat structure of the cellular eliminator allows wider support spans, smaller supports, and/or more top-side structural support so maintenance personnel can stand on or walk across the top of the eliminator.

The prior art relating to parallel blade eliminators is crowded with improvements on the geometry of curvature, trailing edges, leading edges, and construction. The most relevant prior art to the current invention of which the inventors are currently aware are U.S. Pat. Nos. 4,601,731 and 5,464,459, which disclose drift eliminators having a plurality of parallel blades, where the lower edge of each blade is cut with drainage teeth in a saw tooth pattern. U.S. Pat. No. 4,601,731 discloses that this pattern provides enhanced water drainage and reduced pressure drop. The present invention is distinctive not only in geometry but also in mechanism of operation from the prior art.

The present invention is an improved cellular drift eliminator comprising blades and spacer elements that create the cells of the cellular drift eliminator. Only the lower edges of the spacer elements have cut out portions. The cut out portions concentrate and promote water drainage from the spacer portion of the eliminator assembly toward the parallel impingement blades. Because the invention has improved drainage of the spacer section, it remains drier, raising the useful drift point of the eliminator by approximately 10%, particularly at conditions that would flood a comparable eliminator without the improvements.

The effectiveness of the present invention to raise the drift point, especially at flooding conditions, is graphically illustrated in the drift rate versus circulating water flow curve of FIG. 11. The drift point curve 100 is representative of a common cellular drift eliminator. Drift point curve 106 is representative of a parallel blade drift eliminator, showing its reduced capability as indicated by a lower drift curve, corresponding to a greater area of unacceptable drift above the curve. Drift point curve 108 is representative of the improved cellular drift eliminator of the present invention.

The advantage of a cellular drift eliminator's increased impingement surface is, however, detrimental to low air pressure drop. In a cellular eliminator, a water film within the interior passages of a cell reduces the effective area for air to pass, resulting in increased pressure drop. Another advantage of the invention is that it reduces the air pressure drop of a cellular eliminator to correspond to the air pressure drop typically associated with a parallel blade eliminator. The cut out portions in the spacer elements allow a wider and more open region for air to enter into the eliminator structure. Water drainage is concentrated toward the widely spaced parallel blade surfaces rather than from simultaneously all around the bottom edges of the blades and spacers which lie in the same plane, keeping the interior of the cells drier than if the cutout portions were not present. By keeping the interior of the cells drier, air has the maximum area of passage at minimum pressure drop.

Lower air pressure drop and higher drift points allow the present invention to enhance both thermal efficiency and thermal capability in a tower. Further, the improved cellular eliminator retains its structural integrity and provides a flat mounting surface inside a tower. Unlike the invention of aforementioned parallel blade patent, U.S. Pat. No. 4,601,731, the present invention is structurally superior, because its weight is supported on the flat bottom surfaces of the eliminator blades rather than concentrated only on the drainage points, and it does not need any special or elaborate support modifications in the tower. Retaining the structural integrity of the bottom surface is particularly important because the eliminators are often used as a working platform by maintenance personnel and because eliminators often need to be replaced in the field without the added difficulty of tower structural modifications.

The present invention was a surprising discovery in view of laboratory testing of parallel blade eliminators with saw tooth drainage points similar to the prior art compared to parallel blade eliminators without such saw tooth drainage points used in the same tower apparatus of the test. Such laboratory testing has not supported all of the benefits claimed for including saw tooth drainage points. Thus, the testing demonstrated that there was no significant difference in performance using the parallel blade eliminators with or without saw tooth drainage points. Adding saw tooth drainage points did not measurably reduce the pressure drop, and the drift rate increased slightly, possibly due to a reduction in impingement surface.

The drift eliminator improvements of the present invention are intended to and do dry the eliminator and raise the drift point, especially at high circulating water flows. Because water films are relatively thin, and drainage drops on cellular drift eliminators are relatively small, significant pressure drop reductions were not expected from drainage improvements, especially in view of the test results reported above concerning the use of saw tooth drainage points on parallel blade eliminators. Surprisingly, the invention exceeded expectations in reducing the eliminator pressure drop, and therefore, improving the thermal efficiency of the apparatus by 1–3%. Both higher drift points and improved thermal efficiency were achieved in the tower apparatus with the present invention. Improving thermal efficiency to this apparently small extent is actually quite significant. With this type of heat exchange equipment, it is difficult to improve thermal efficiency at all. Many modifications that have been made throughout the years actually reduce the thermal efficiency, in view of the complicated interaction of all components with the variables of water flow and air flow in any given system. Since these types of heat exchange systems are already quite efficient, even apparently small improvements to thermal efficiency are quite significant in meeting legislated energy efficiency mandates as well as in benefiting the tower user with reduced energy costs over the lifetime of the equipment.

Such drift eliminator enhancements of the present invention can be applied to both induced draft and forced draft counter-flow equipment. Further, drift eliminators may be used in indirect towers (closed circuit coolers) and evaporative condensers with equal benefit. Although the liquid is usually water and the as is usually air, the drift eliminators can be used with systems designed for other liquids and other gases.

SUMMARY OF THE INVENTION

The present invention relates to a cellular drift eliminator for removing mist from a mist-laden gas stream passing through the drift eliminator, the drift eliminator comprising:

a plurality of blades having a longitudinally undulating shape wherein at least one undulation is oriented transverse to the direction of travel of the mist-laden gas steam passing through the drift eliminator, each of the blades having an upper edge and a lower edge, a front face and a rear face, the upper edges of the blades being located substantially in a first plane and the lower edges of the blades being located substantially in a second plane, the first and second planes being generally parallel to each other;

plurality of spacer elements wherein one spacer element is interspersed between every two blades, the spacer elements having a longitudinally undulating shape wherein at least one undulation is oriented transverse to the direction of travel of the mist-laden gas stream passing through the drift eliminator in an orientation corresponding to the orientation of the undulation of the blade, each of the spacer elements having an upper edge and a lower edge, a front face and a rear face and a plurality of corrugations oriented transverse to the spacer element undulation, each of the corrugations of the spacer element comprising two side walls connecting a flattened apex extending from the front face of the spacer elements and a flattened valley extending from the rear face of the spacer element, the lower edge of each spacer element having flat planar portions formed at the lower edge in the regions of the flattened apices and valleys of the corrugations and cut portions extending from the lower edge in the regions of the side walls of the corrugations;

the spacer elements being attached to the blades such that at least some portions of the flattened apices of the corrugations of each spacer element are bonded to bonding portions of the rear face of a first adjacent blade and at least some portions of the flattened valleys of the corrugations of each spacer element are bonded to bonding portions of the front face of a second adjacent blade.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

FIG. 1 is sectional view of one type of evaporative heat exchanger including a drift eliminator according to the present invention.

FIG. 2 is a partial front perspective, exploded view of a blade and one embodiment of a spacer element which, when combined, form a subassembly, several subassemblies being combined to form an improved drift eliminator according to the present invention.

FIG. 3 is a view similar to FIG. 2, but showing a second embodiment of a spacer element according to the present invention.

FIG. 4 is a view similar to FIG. 2, but showing a third embodiment of a spacer element according to the present invention.

FIG. 5 is a left-end view of the first embodiment of the spacer element taken along lines 5—5 of FIG. 2.

FIG. 6 is an end view of the second embodiment of the spacer element taken along lines 6—6 of FIG. 3.

FIG. 7 is an end view of the third embodiment of the spacer element according to the present invention taken along lines 7—7 of FIG. 4.

FIG. 8 is a front perspective view of an assembled blade and spacer element subassembly showing the spacer element used in the exploded view of FIG. 2.

FIG. 9 is a front perspective view of an assembled blade and spacer element subassembly showing the spacer element used in the exploded view of FIG. 3.

FIG. 10 is a front perspective view of an assembled blade and spacer element subassembly showing the spacer element used in the exploded view of FIG. 4.

FIG. 11 is a graph schematically showing the relative relationship between air velocity and recirculating water flow inside a tower and its effect on the drift point.

DETAILED DESCRIPTION OF THIS INVENTION

The invention will now be described in detail with reference to the drawings, wherein like numerals indicate like elements throughout the several views.

Certain terminology may be used in the following description for convenience only and is not limiting. The words "front" and "rear", "upper" and "lower" designate directions in the drawings to which reference is made, as if the drift eliminator were used in the orientation of the drift eliminator 30 shown in FIG. 1, as described below. The terminology includes the words above specifically mentioned, derivatives thereof, and words of similar import. Furthermore, as used herein, the article "a" or "an" or a singular component includes the plural or more than one component, unless specifically and explicitly restricted to the singular or a single component, or unless otherwise clear from the context containing the term.

To help illustrate the environment in which the improved cellular drift eliminators of the present invention are used, FIG. 1 shows an induced draft counter-flow cooling tower type of heat exchanger 10 having a drift eliminator 30 positioned therein. It should be understood that the particular details of the heat exchanger 10 do not form a part of the present invention, and that the drift eliminator of the present invention can be used with other types of heat exchangers in which water is removed from air, or other types of equipment, such as environmental scrubbers, in which various other liquids are removed from various other gases. Other typical types of heat exchangers include forced draft counter-flow heat exchangers ,and induced draft or forced draft closed circuit cooler or evaporative condenser heat exchangers. In the counter-flow heat exchangers, the drift eliminators are located as illustrated generally in FIG. 1.

In the induced draft counter-flow heat exchanger 10 of FIG. 1, a fan 12, driven by any appropriate motor and associated drive elements (not shown), induces the flow of fresh air through air inlets 14 and 16 into the heat exchanger and out through the top of the heat exchanger. The air travels through a plurality of air and water contact bodies in the form of wet deck fill 18. A fluid to be cooled, such as heated water, is supplied to a series of spray pipes 20 through inlet 22, resulting in a spray of water 24 over the wet deck fill 18. The water pours over the wet deck fill in a direction opposite (namely, counter) to the flow of the air. As the air and water meet, heat is transferred from the higher temperature water to the lower temperature air through the evaporative cooling process, causing the temperature of the water to decrease and the wet-bulb temperature of the air to increase. Water drains from the wet deck fill into a cooled water sump or drainage area 26. The water leaves the heat exchanger through a cooled water outlet 28, typically to be recycled through the heat exchanger.

As the air stream passes through the heat exchanger, the air stream picks up water droplets or mist and the humidity of the air stream increases. A drift eliminator 30 removes the water droplets from the air stream as described above in the "Background" section and the air from which the water droplets have been removed is exhausted through an air outlet 32 at the top of the heat exchanger.

Figure 2:
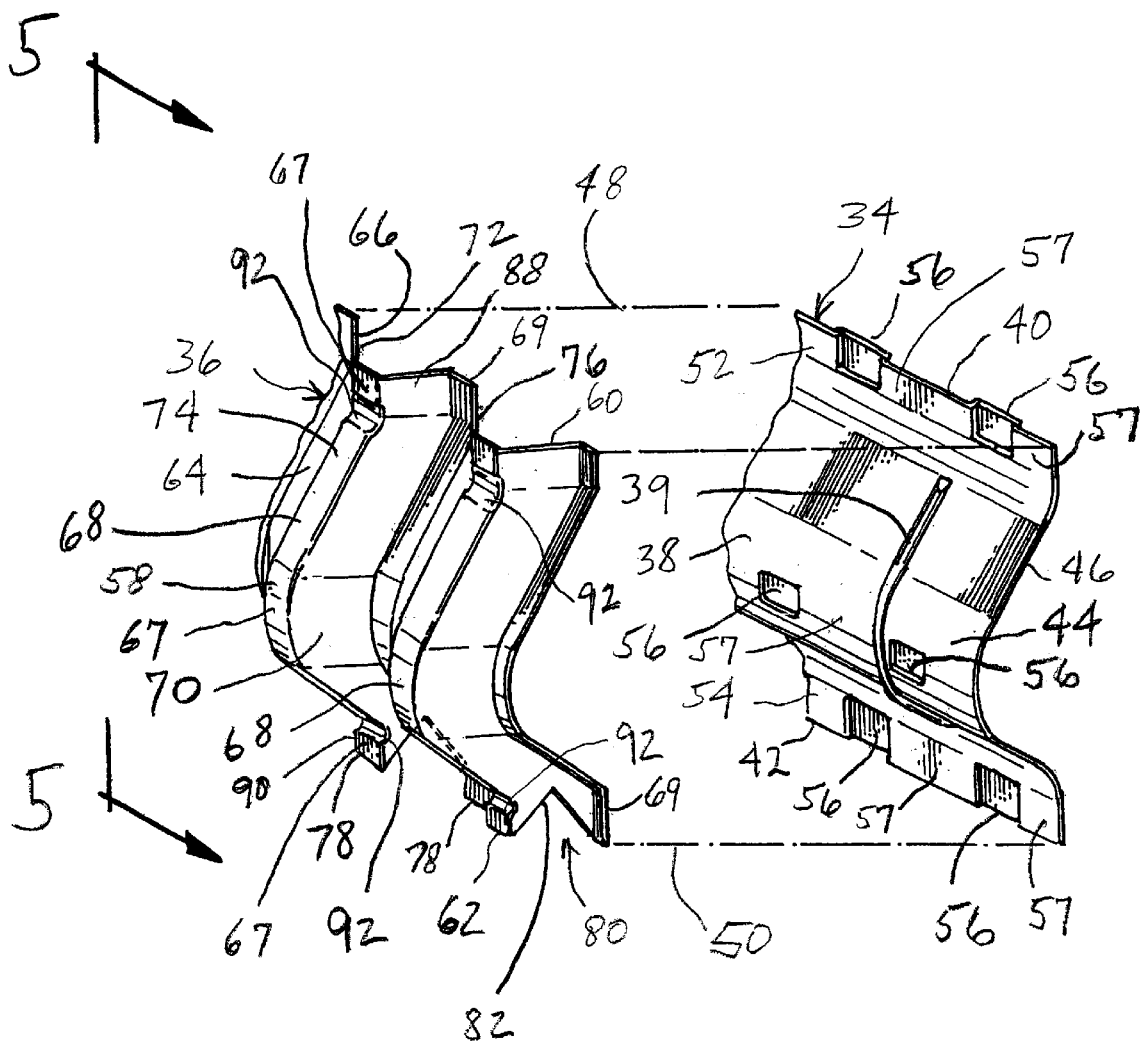
Figure 3:
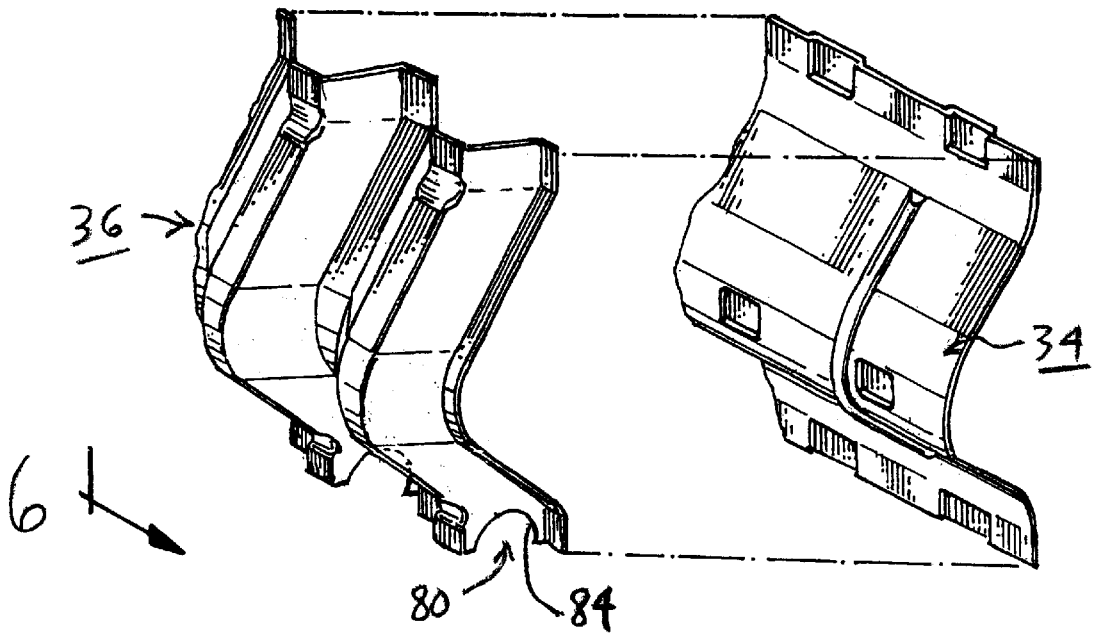
Figure 4:
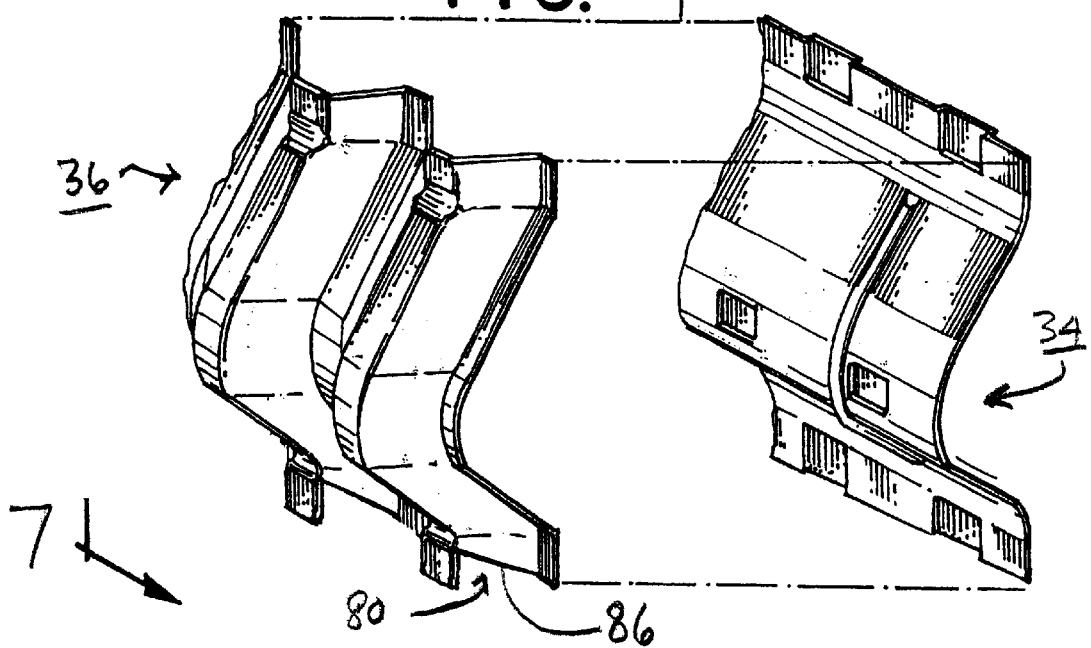
Figure 8:
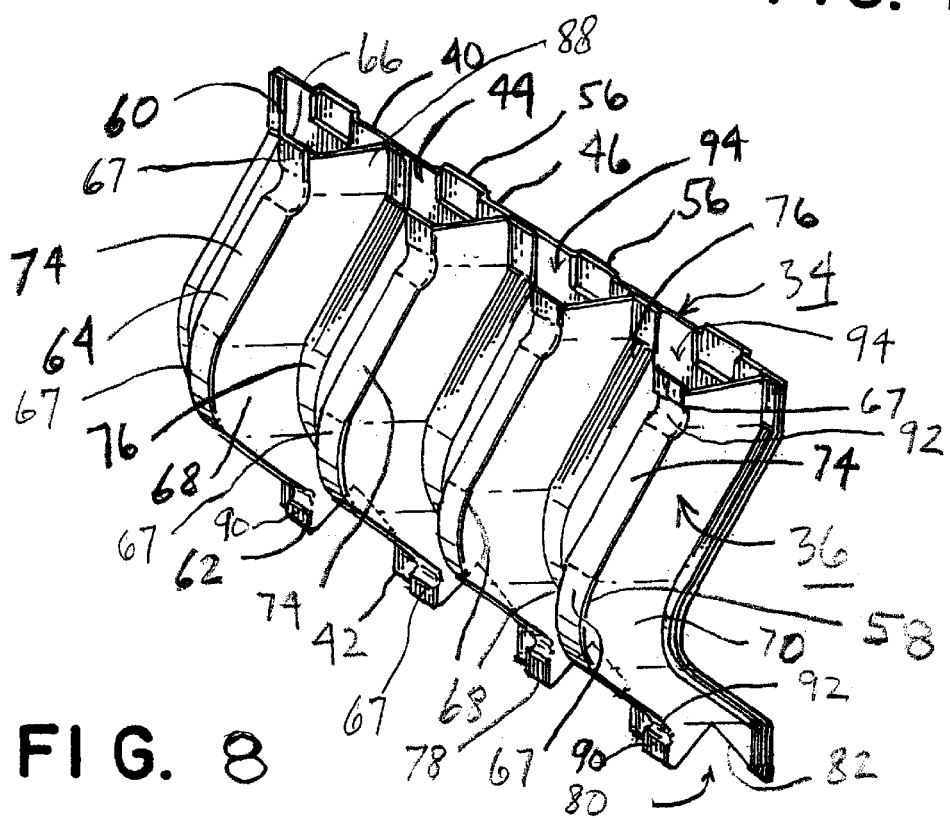
Figure 9:
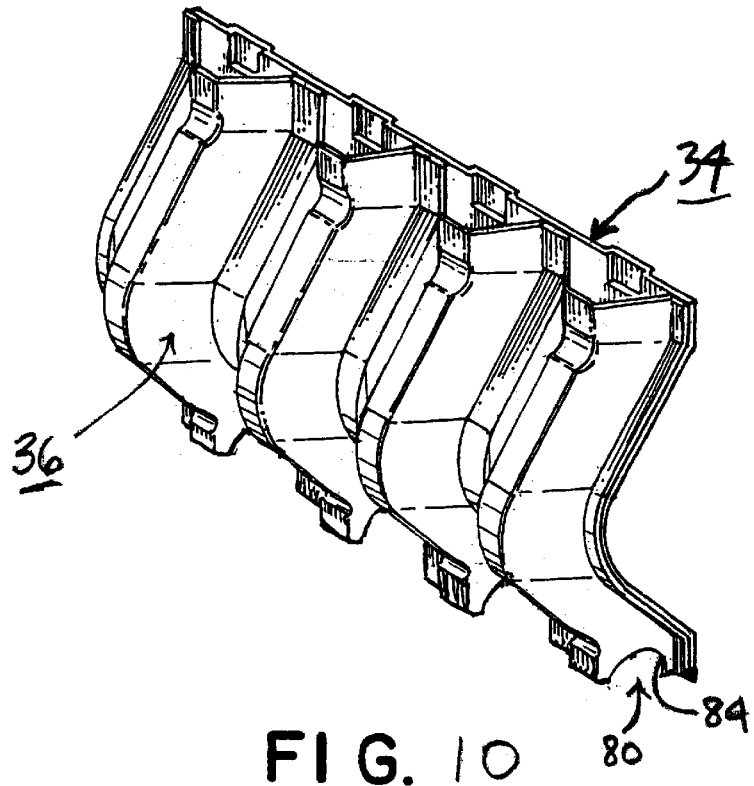
Figure 10:
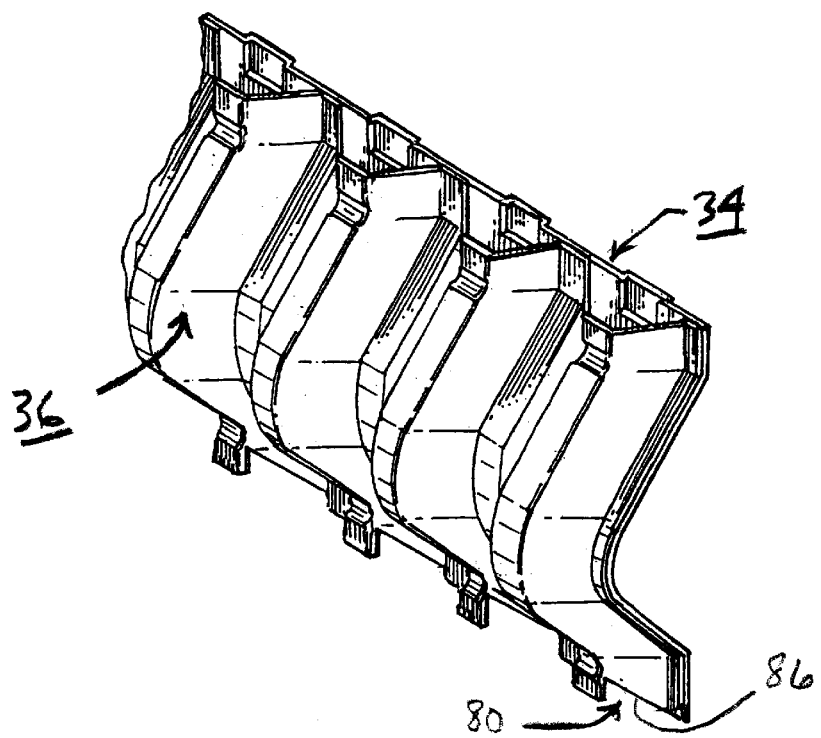

The remaining figures illustrate various embodiments of a drift eliminator for removing mist from a mist-laden gas stream passing through the drift eliminator. The drift eliminator comprises a plurality of blades 34 forming the primary surfaces on which the mist or water droplets impinge and are thereby eliminated from the air or other gas stream passing through the drift eliminator. The blades are spaced apart by spacer elements 36 interposed between each pair of blades 34. For ease of illustration and for clarity of understanding, FIGS. 2 through 4 show exploded views, and FIGS. 8 through 10 show assembled views of a subassembly of only one blade 34 and one spacer element 36.

The blades and spacer elements may be made from a variety of materials, for example, thermoplastic synthetic polymers, such as polyvinylchloride, polystyrene, acrylonitrile-butadiene-styrene, polypropylene, etc.; metals such as galvanized or stainless steel, aluminum, copper or the like; materials such as asbestos or cellulose; or alloys of thermoplastic materials, such as alloys of polyvinylchloride with other thermoplastic materials; composite materials such as fibrous cellulosic stock impregnated with a thermoplastic resin or the like.

Examples of other synthetic polymers and engineering resins which may be used include acetals, nylons, polyphenylene oxides, polycarbonates, polyether sulfones, polyaryl sulfones, polyethylene terephthalates, polyetherketones, polypropylenes, polysilicones, polyphenylene sulfides, polyionomers, polyepoxies, polyvinylidene halides, and the like. As will be recognized by those skilled in the art, the choice of a particular material is dictated by the application conditions. The presently preferred type of material is a synthetic polymer, and specifically, polyvinylchloride.

The blades and spacer elements may be manufactured by any conventional technique that is appropriate for the material selected. For example, when the blades and spacer elements are to be manufactured from flat stock material of a thermoplastic synthetic polymer such as unplasticized polyvinylchloride, the individual contact body sheets may be thermally formed by a process such as thermoforming, pressure forming, vacuum forming, molding, hot stamping, or the like. For efficiency of manufacturing, two of each of the blades and spacer elements are individually made at the same time and then cut along a center line which becomes a lower edge of each of the blades and spacer elements. In this way, not only are two of each of the blades and spacer elements made at one time, but also, it is easier to form the cutout portions, an integral part of the lower edge of the spacer elements, as described below, in an efficient manner. Similarly, if desired, more than two of each of the blades and spacer elements may be formed at one time from sheet material, and individually separated following the procedure generally described above.

Figures 5, 6, 7:
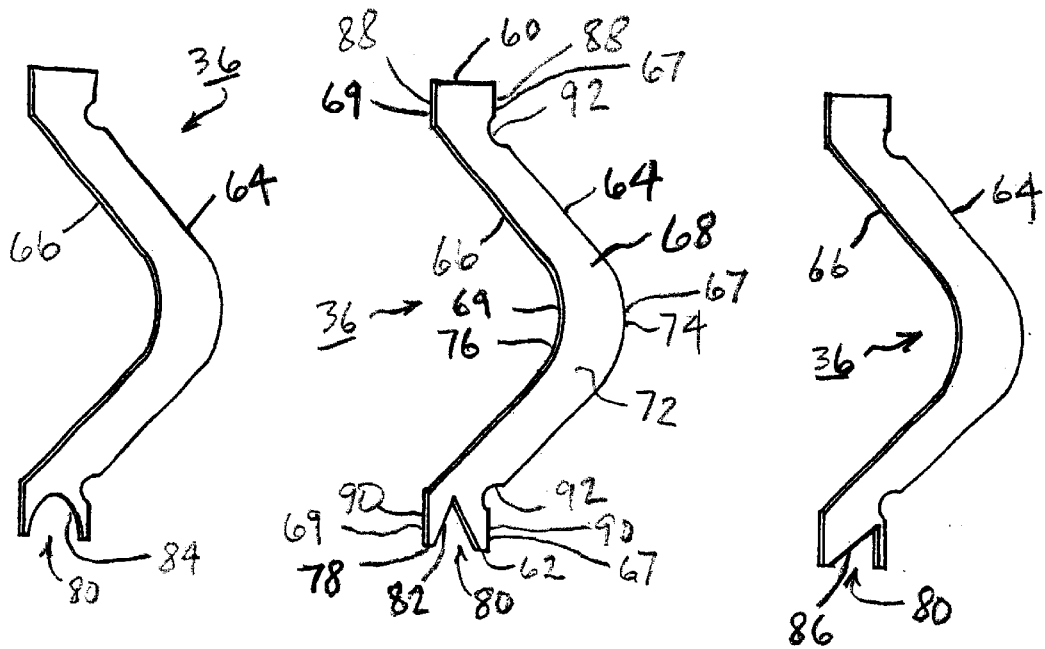

The description of the blades 34 and spacer elements 36 is best understood with reference to FIGS. 2, 5 and 8, directed to a first embodiment of a drift eliminator according to the present invention. Since the other embodiments of the drift eliminators are similar, except for the cut portion of the lower edge of the spacer elements, again as described below, the other figures will not be described in such detail as FIGS. 2, 5 and 8. However, one can easily see the similarities and differences among the embodiments based on the following description.

Each of the blades 34 used in the present invention has a longitudinally undulating shape including at least one undulation 38 which is oriented transverse to the direction of travel of the mist-laden gas stream passing through the drift eliminator. The undulation 38 forms the primary impact surface on which the drops or mist impinges. Although only one undulation 38 is shown, if desired, the blades could be formed with more than one such transverse undulation. Each blade also has an upper edge 40 and a lower edge 42, a front face 44 and a rear face 46.

A plurality of reinforcing corrugations 39, only one of which is shown in each of FIGS. 2 through 4, helps to reinforce the undulation 38. The plurality of corrugations 39 are transverse to and unitarily formed in the undulation, either extending from the front face 44 as illustrated, or extending from the rear face 46 of the blade 34. The reinforcing corrugations 39 are spaced laterally from each other along the length of the undulation 38. The reinforcing corrugations do not significantly affect the flow of the gas or liquid through the drift eliminator, but are provided to enhance the mechanical strength of the blades 34.

The upper edges 40 of all of the blades are preferably located substantially in a first plane 48. The lower edges 42 of all of the blades are likewise preferably located substantially in a second plane 50. Preferably, the first plane 48 and second plane 50 are generally parallel to each other. As used herein, the location of the upper and lower edges "substantially" in the respective first and second planes means that the respective edges are located in a plane within reasonable manufacturing, assembling and bonding tolerances, not exact mathematical precision. Likewise, as used herein, with reference to the first and second planes being "generally" parallel to each other, it is meant that the planes are parallel within a reasonable manufacturing, assembling and bonding tolerance, and not with mathematical precision. In the process of forming the drift eliminator from a plurality of blades and spacer elements, there is likely to be some variation in the planarity of each of the planes and, therefore, also in the degree of how parallel the two planes are with respect to each other.

The blades 34 also include a first, upper vertical portion 52 extending from the undulation 38 to the upper edge 40, and a second, lower vertical portion 54, extending from the undulation 38 to the lower edge 42. Flat bonding pads 56, preferably extending slightly from the rear face are formed in the blades. Flat bonding areas 57 are located on the front face of the blades.

With reference primarily to FIGS. 2, 5 and 8, where the elements are numbered in detail, the spacer element 36 will now be described.

The spacer element 36 has a longitudinally undulating shape having at least one undulation 58 oriented transverse to the direction of travel of the mist-laden gas stream passing through the drift eliminator. The orientation of the undulation 58 of the spacer element 36 corresponds to the orientation of the undulation 38 of the blade 34. As was the case with the blade 34, the spacer element may have more than one such transverse undulation, the primary requirement being that the undulation(s) of the spacer element 36 must correspond with the undulation(s) of the blade 34, such that the spacer element and the blade have the same overall shape so that they can fit together and, when assembled, form the drift eliminator 30 of the present invention.

Each spacer element 36 has an upper edge 60, a lower edge 62, a front face 64 and a rear face 66. It is preferred that the upper edges 60 of all of the spacer elements 36 are located substantially in a same first plane and that flat portions of the lower edges 62 of the spacer elements are all located substantially in a same second plane, and that such first and second planes are generally parallel to each other. It is further preferred that the upper edges 60 of the spacer elements 36 are located substantially in the same first plane 48 as the upper edges 40 of the blades 34. Likewise, it is preferred that the flat portions of the lower edges 62 of the spacer elements 36 are located substantially in the same second plane 50 as the lower edges 42 of the blade 34.

Front face bonding areas 67 are located on the front face 64 of the spacer element 36 in locations corresponding to location of the bonding pads 56 formed on the rear face of the adjacent blade 34, where such blade is located in front of the spacer element 36, rather than behind the spacer element 36 as illustrated in the drawings. Rear face bonding areas 69 are located on the rear face of the spacer element 36 in locations corresponding to the front face bonding areas 57 of the blade 34 adjacent to the rear face of the spacer element 36 as shown in the drawings.

The spacer elements 36 act as spacer elements by virtue of the unitary formation as part of the shape of the spacer elements of a plurality of corrugations 68 transverse to the undulation 58. Each corrugation 68 includes preferably angled side walls 70 and 72. Each side wall is connected to and unitarily formed with a flattened apex 74 and a flattened valley 76, respectively forming part of the front fact 64 and rear face 66 of the spacer element 36. The dimensions and angles of the side walls 70 and 72 determine the spacing between pairs of blades 34 bonded to opposite sides of the spacing element 36. This spacing distance will vary depending upon the type of equipment and the particular parameters of the equipment in which the drift eliminator of the present invention is being used.

The lower edge 62 of the spacer elements 36 has a flat planar portion 78 and cut portions generally identified as 80. The cut portions 80 are formed only in the side walls 70 and 72 of the corrugations 68, and not in the planar portions 78.

The cut portions 80 may have various shapes, such as an inverted V-shaped cut or notch 82 shown in FIGS. 2, 5 and 8, an arcuate cut or notch 84 shown in FIGS. 3, 6 and 9, and an angle cut or notch 86 shown in FIGS. 4, 7 and 10. The inverted V-shaped cut 82 formed in each side wall 70 and 72 extends from the flat portions 78 of the lower edge 62 of each of the valleys 76 upward and at an angle to about the middle of the side wall between each of the apices 74 and valleys 76, and then downward along an angle to the lower edge 62 of the each of the apices 74. The arcuate cut 84 in each side wall 70 and 72 extends from a flat portion 78 of the lower edge 62 of each of the valleys 76 arcuately upward to about the middle of the side wall between each of the apices 74 and the valleys 76, and then arcuately downward to the lower edge 62 of each of the apices 74. The angled cut 86 formed in each side wall 70 and 72 extends from the flat portion 78 of the lower edge 62 of each of the valleys 76 upward at an angle to each of the apices 74, and then downward along a junction of each side wall and the apices to the lower edge 62 of each of the apices 74.

As was the case with blades 34, the spacer elements 36 include a first vertical portion 88 extending from the undulation 58 to the upper edge 60. A second vertical portion 90 extends from the undulation 58 to the lower edge 62. As is best seen in FIGS. 2, 5 and 8, the cut portions 80 of whatever configuration are formed only in the side walls 70 and 72 and do not affect the flat planar portion 78 of the lower vertical portion 90 of the edge 62 of the apices 74 or the valleys 76. This is important so that there will be sufficient surface area in the second, lower vertical portions 90 to act as front face bonding areas 67 so that the front face 64 of the spacer element 36 can be bonded effectively to the flat bonding pad areas 56 on the rear face of adjacent blades 34, and so that the rear face bonding areas 69 on the rear face 66 of the spacer element can be bonded effectively to the flat bonding pad areas 57 on the front face of the blades 34.

Concave arcuate areas 92 are formed unitarily in the apices 74 located where each vertical portion 88 and 90 joins the undulation 58. The concave arcuate areas 92 allow the assembled drift eliminator to compensate for any misalignment that may occur during the assembly and bonding of the blades 34 to the spacer elements 36. Thus, by providing the concave arcuate areas 92, if the first vertical portion 52 or the second vertical portion 54 of the blades 34 extend somewhat downwardly or upwardly, respectively, with relation to the spacer elements 36, the manufacturing, assembly and bonding tolerance can be accommodated without the first and second vertical portions 52, 54 of the blade 34 adversely impacting the undulation 58 of the spacer element 36. The concave arcuate areas thereby alleviate any significant adverse misalignment of the blades and spacer elements during the formation of the drift eliminator of the present invention.

FIGS. 8, 9, and 10 illustrate one blade 34 bonded to one spacer element 36, resulting in the formation of cells 94 between each blade and each spacer element. Thus, when a plurality of blades and spacer elements are bonded together, they form a cellular type of drift eliminator.

As mentioned above, the blades and spacer elements are preferably fabricated in pairs of mirror-image blades or spacer elements and, during their respective formation, each is connected along what will be their respective lower edges when the individual blades and spacer elements are separated from each of the pairs, such as by die cutting, or the like. In this formation process, regarding the spacer element 36 best shown in FIG. 5 and having an inverted V-shaped cut portion 82, when the two spacer elements are formed and joined together, the cut area is actually in the shape of a diamond. When the spacer elements are separated, the cut portions 80 of each of the spacer elements are in the shape of one-half of a diamond or the V-shaped cut or notch 82 of FIGS. 2, 5 and 8.

Similarly, in forming two joined spacer elements in which the cut area 80 is in the form of an arcuate cut 84 as shown in FIGS. 3, 6 and 9, prior to separating the individual spacer elements, the cut portions are in the form of a circle. Likewise, with respect to the embodiment of the present invention in which the cut portion 80 is in the form of an angled cut or notch 86, as shown in FIGS. 4, 7 and 10, the cut portions of the two joined spacer elements is in the form of a triangle, resulting in the angled cut 86 in the form of half of the triangle in each of the separated spacer elements.

By forming the cut portions 80 only in the side walls 70 and 72 of the spacer elements, leaving intact the flat planar portions 78 of the lower edge 62 of the spacer elements for bonding in the bonding areas 56 and 57 to the respective front and rear faces of the adjacent front and rear blades 34, a cellular type of drift eliminator is formed with improved drainage surfaces corresponding to the inlet surfaces or, as mentioned for the embodiments described herein of the drift eliminator 30 for use in a counter-flow type of evaporative heat exchanger, the lower edges.

Bonding of the spacer elements and the blades is generally accomplished in three locations. One is between the respective front and rear bonding pads and bonding areas 57 and 69, and 56 and 67 associated with the first, upper vertical portions 52 of the blade 34 vertical portions 88 of the spacer element 36. The second bonding locations are formed between the associated bonding pads and bonding areas 57 and 69 and 56 and 67, where bonding areas 67 and 69 are along the flat planar portions 78 of the lower edge 62 of the spacer elements, all of these bonding areas being associated with the second, lower vertical portions 54 and 90 of the blade 34 and spacer element 36, respectively. The third location for bonding is where the blades and spacer elements contact each other along the middle of the undulations 38 and 58 at similarly numbered bonding pads and bonding areas.

Bonding of the blades and spacer elements together may be accomplished by any number of different types of bonds, including solvent bonds, adhesive bonds and fusion bonds, all of the above being preferred when the blades and spacer elements are made of synthetic polymers Appropriate solvents and adhesives are well known to those skilled in the art based upon the type of material used to make the blades and spacer elements. Fusion bonds may be accomplished by direct application of heat using appropriately shaped heated platens, or indirectly by ultrasonic bonding or radio frequency bonding. If the blades and spacer elements are made of metal, adhesive bonding or welding, at least along the upper and lower edges, can bond the blades and spacer elements together in an effective manner.

Any number of blades and spacer elements can be assembled together to form drift eliminators according to the present invention. The dimensions of the individual blades and spacer elements can be varied depending upon the application of the drift eliminator and any particular setting.

When the blades and spacer elements are assembled together to form the cellular drift eliminator of the present invention, the cut portions 80 provide a wider open air entry region and a drainage surface, typically the inlet or lower surface or edge enhancement that promotes rapid growth of collected water droplets or mist to overcome both surface tension and aerodynamic forces and thereby drain rapidly and completely off of the spacer elements toward the blades elements. The enhanced drainage also reduces the pressure drop across a drift eliminator allowing lower powered motors to be used for the fans, resulting, in turn, in more economical operation of the equipment in which the drift eliminators of the invention are used. Another beneficial result of using the drift eliminators of the present invention, compared to using drift eliminators with flat lower edges, is that the improved drainage creates a drier eliminator, allowing higher drift points. This allows more air to be drafted through the equipment, resulting in better thermal performance of the equipment.

The use of highly corrugated spacer elements 36, together with adjacent substantially uncorrugated blades 34 (except for the minor reinforcing corrugations 39), allows for a large, relatively smooth blade contact area on which the liquid in the liquid-laden gas stream impinges so that the mist or droplets are concentrated before reaching the drainage area of the drift eliminator. This arrangement, together with the cut-out areas of the spacer elements, provides the enhanced benefits and advantages discussed above for the present drift eliminator Surprising and valuable effects have resulted from this invention. The enhancements are the greatest in factory-assembled cooling towers where the drift eliminators are very compacted against the spray system, and for other drift eliminator applications where the drift eliminators are heavily wetted.

The present invention may be embodied in other specific forms without departing from the spirit or essential attributes thereof and, accordingly, reference should be made to the appended claims, rather than to the foregoing specification as indicating the scope of the invention.

What is claimed is:

1. A cellular drift eliminator for removing mist from a mist-laden gas stream passing through the drift eliminator, the drift eliminator comprising:

a plurality of blades having a longitudinally undulating shape wherein at least one undulation is oriented transverse to the direction of travel of the mist-laden gas steam passing through the drift eliminator, each of the blades having an upper edge and a lower edge, a front face and a rear face, the upper edges of the blades being located substantially in a first plane and the lower edges of the blades being located substantially in a second plane, the first and second planes being generally parallel to each other;

a plurality of spacer elements wherein one spacer element is interspersed between every two blades, the spacer elements having a longitudinally undulating shape wherein at least one undulation is oriented transverse to the direction of travel of the mist-laden gas stream passing through the drift eliminator in an orientation corresponding to the orientation of the undulation of the blade, each of the spacer elements having an upper edge and a lower edge, a front face and a rear face and a plurality of corrugations oriented transverse to the spacer element undulation, each of the corrugations of the spacer element comprising two side walls connecting a flattened apex extending from the front face of the spacer elements and a flattened valley extending from the rear face of the spacer element, the lower edge of each spacer element having flat planar portions formed at the lower edge in the regions of the flattened apices and valleys of the corrugations and cut portions extending from the lower edge in the regions of the side walls of the corrugations;

the spacer elements being attached to the blades such that at least some portions of the flattened apices of the corrugations of each spacer element are bonded to bonding portions of the rear face of a first adjacent blade and at least some portions of the flattened valleys of the corrugations of each spacer element are bonded to bonding portions of the front face of a second adjacent blade.

2. The drift eliminator of claim 1 wherein each cut portion is an angled cut in each side wall extending from a flat portion of the lower edge of each of the valleys upward at an angle to each of the apices, and then downward along a junction of each side wall and the apices to the lower edge of each of the apices.

3. The drift eliminator of claim 1 wherein each cut portion is an inverted V-shaped cut in each side wall extending from a flat portion of the lower edge of each of the valleys upward at an angle to about the middle of the side wall between each of the apices and the valleys, and then downward along an angle to the lower edge of each of the apices.

4. The drift eliminator of claim 1 wherein each cut portion is an arcuate cut in each side wall extending arcuately upward from a flat portion of the lower edge of each of the valleys to about the middle of the side wall between each of the apices and the valleys, and then arcuately downward to the lower edge of each of the apices.

5. The drift eliminator of claim 1 wherein each of the blades and spacer elements has a single longitudinal undulation extending from the front face, with a first vertical portion extending from the undulation to the upper edge and a second vertical portion extending from the undulation to the lower edge.

6. The drift eliminator of claim 5 wherein each of the apices of the corrugations of the spacer elements has a concave arcuate area located where each of the vertical portions joins the undulation.

7. The drift eliminator of claim 1 wherein each of the blades has bonding portions in the form of flattened bonding pads extending outwardly from the rear face of blades.

8. The drift eliminator of claim 1 wherein each blade has a plurality of reinforcing corrugations transverse to and unitarily formed in the undulation, the reinforcing corrugations being spaced laterally from each other along the undulation.

9. The drift eliminator of claim 1 wherein the upper edges of the blades and the upper edges of the spacing elements are arranged to be substantially in the same plane.

10. The drift eliminator of claim 1 wherein the lower edges of the blades and the flat portions of the lower edges of the spacing elements are arranged to be substantially in the same plane.

11. The drift eliminator of claim 1 wherein the blades and the spacing elements have the same height such that the upper edges of blades and spacing elements are arranged to be substantially in a same first plane and the lower edges of the blades and the flat portions of the lower edges of the spacing elements are arranged to be substantially in a same second plane.

12. The drift eliminator of claim 1 wherein the blades and the spacing elements are made of a synthetic polymer and bonded together by a bond selected from the group consisting of a solvent bond, an adhesive bond and a fusion bond.

* * * * *